Patented June 24, 1924.

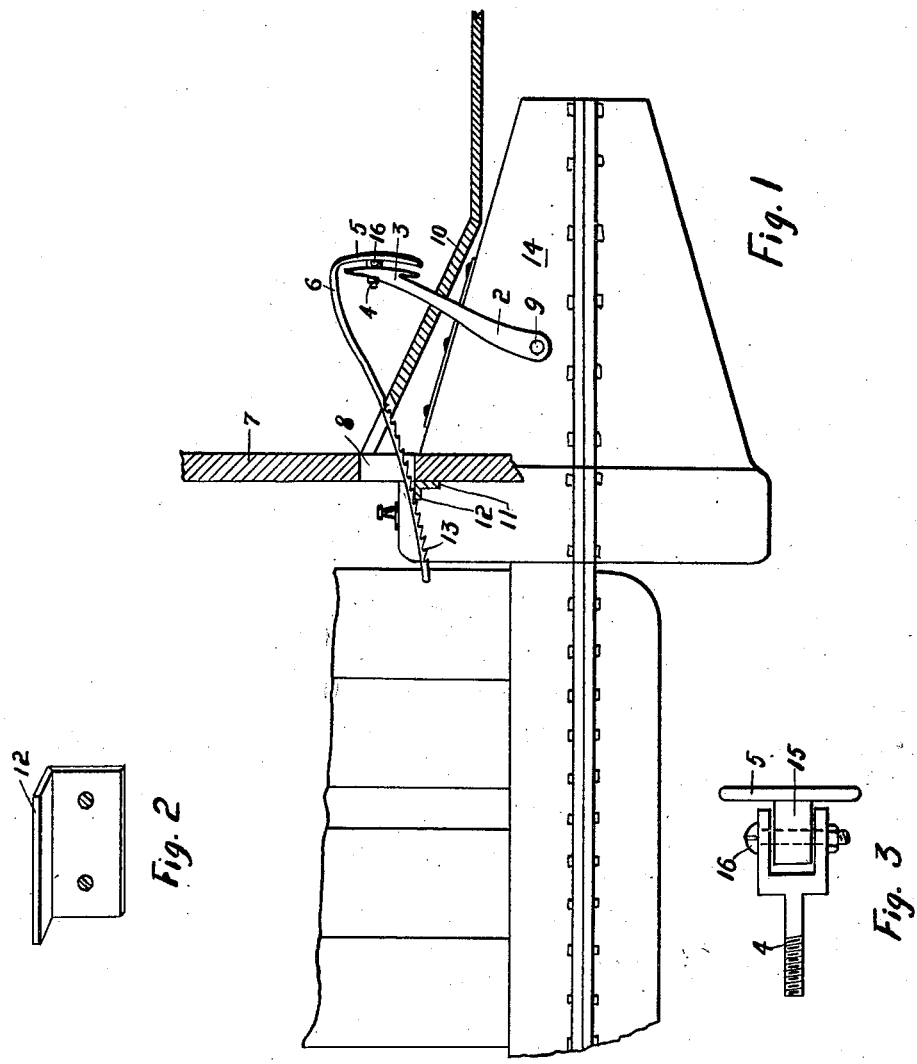

1,499,263

UNITED STATES PATENT OFFICE.

ALBERT J. THONEN AND JOSEPH F. PALMER, OF FRESNO, CALIFORNIA.

PEDAL LOCK FOR AUTOMOBILES.

Application filed December 28, 1922. Serial No. 609,392.

*To all whom it may concern:*

Be it known that we, ALBERT JOHN THONEN and JOSEPH FRANK PALMER, citizens of the United States, and residents of Fresno, in the county of Fresno and the State of California, have invented a new and useful Improvement in Pedal Locks for Automobiles, of which the following is a specification.

Our invention relates to a pedal lock for an automobile.

It is commonly known that on a Ford automobile one of the pedals is adapted to be in neutral when in a fixed position, and by pressing the pedal further, it throws the machine into low gear, and that to retain the pedal in any of such positions it is necessary to hold it with one's foot. The object I have accomplished is the combination of a pawl and ratchet attached to the pedal whereby the pedal can be held in either of a plurality of fixed positions above referred to, and readily released, by tilting an auxiliary pedal. Another object I have accomplished is a combination of pawl and ratchet which can readily be attached to the pedal and one which is cheap to construct.

These objects are accomplished by means of the device hereinafter described and illustrated on the accompanying drawing, in which Figure 1 is a side elevation of a clutch pedal, and a part of a gear case of an automobile, showing our invention assembled therewith. Figure 2 is an enlarged pawl. Figure 3 shows a view of the hinge which is adapted to be attached to the regulation pedal on the automobile. In said drawing 14 is a gear case. The pedal 3 is attached to the pedal arm 2 which swings on the shaft 9. The floor boards are shown as 10. A hole 8 is cut through the dash board 7, and the pawl 11 is attached to the dash-board so that flange 12 on the pawl extends horizontally and toward the front of the machine. I have formed a ratchet 6 having a plurality of teeth or cogs on the under side. Ratchet 6 is attached to an auxiliary foot plate 5 which is pivoted to the foot pedal 3 so that the ratchet can be raised above the pawl by slightly tilting the auxiliary foot plate. When assembled the ratchet normally engages the pawl, but, it can be released by pressing the lower part of auxiliary plate 5, thus tilting it. It is noted that the hinge consists of a bolt adapted to pass through the pedal plate 3, said bolt having a U shaped head into which a lug 15 is adapted to fit, and said bolt head and lug are pivoted together with a pin or bolt 16.

Having described our invention we claim as new and ask for Letters Patent.

1. In combination with the clutch pedal plate of a Ford automobile, of an auxiliary pedal plate pivoted to the clutch pedal plate so that it can have a rocking movement by means of an eye in the back of the auxiliary plate and an eye-bolt cooperating with the eye, said eye-bolt being attached to the clutch pedal, said auxiliary plate having a ratchet attached at the top thereof and positioned to extend through the dashboard of said automobile, and a pawl attached to said dashboard adjacent to the opening through which the ratchet passes, and adapted to co-operate with it, substantially as described.

2. In combination with a clutch actuating pedal plate of a Ford automobile, an auxiliary pedal plate pivoted to the pedal plate by means of an eye in the approximate center of the back of the auxiliary pedal plate, and adapted to have a lateral rocking movement, a ratchet attached to the auxiliary pedal and positioned to extend through a hole in the dashboard, and a pawl adapted to co-operate with the ratchet, said pawl consisting of a plate attached to the dashboard, said plate having a flange in the path of the movement of the ratchet, and adapted to intercept the teeth on the ratchet.

ALBERT J. THONEN.
JOSEPH F. PALMER.